No. 759,123. PATENTED MAY 3, 1904.
S. NICOLSON.
MEANS FOR REMOVING THE RUBBER TIRES OF BICYCLES OR OTHER VEHICLES.
APPLICATION FILED JULY 14, 1903.
NO MODEL.

Witnesses
Inventor
Samuel Nicolson
Attys

No. 759,123. Patented May 3, 1904.

UNITED STATES PATENT OFFICE.

SAMUEL NICOLSON, OF GORE, NEW ZEALAND, ASSIGNOR OF ONE-HALF TO WILLIAM HUGH PATERSON, OF GORE, NEW ZEALAND.

MEANS FOR REMOVING THE RUBBER TIRES OF BICYCLES OR OTHER VEHICLES.

SPECIFICATION forming part of Letters Patent No. 759,123, dated May 3, 1904.

Application filed July 14, 1903. Serial No. 165,430. (No model.)

*To all whom it may concern:*

Be it known that I, SAMUEL NICOLSON, a subject of the King of Great Britain, residing at Gore, in the Colony of New Zealand, have invented a new and useful Means for Removing the Rubber Tires of Bicycles or other Vehicles; and I do hereby declare the following to be a full, clear, and exact description of the same.

This invention has been specially devised for the purpose of providing means whereby the rubber tires of bicycles may be readily removed from off their wheels. As is well known, the operation of removing the tires is one generally entailing considerable difficulty, as, owing to the construction of the tire-cover and the outer periphery of the wheel-rim, a considerable amount of force is required in springing the cover over the top edge of the rim.

The invention is also applicable for removing the tires from the wheels of other vehicles, providing such tires consist of an inner tube and an outer cover.

In describing the invention reference will be made to the accompanying sheet of drawings, in which—

Figure 1:
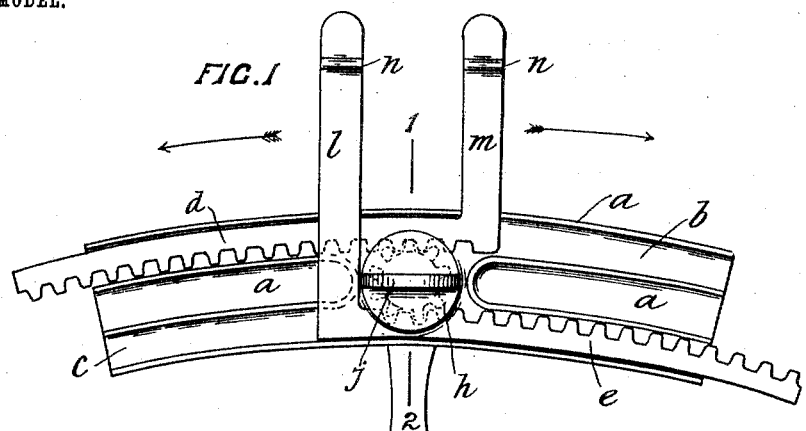
Figure 2:
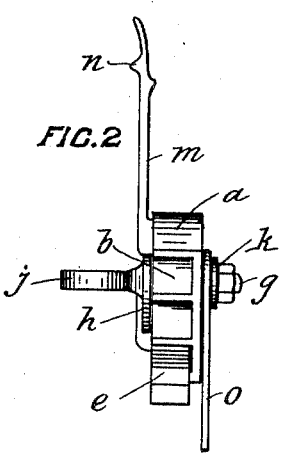
Figure 3:
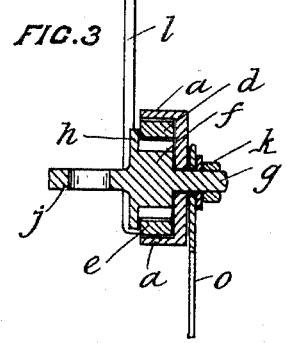
Figure 4:
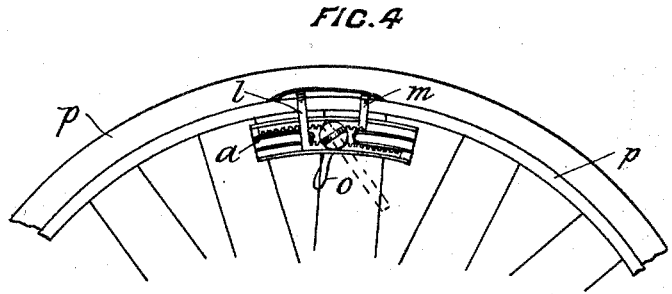

Figure 1 is a front elevation of the appliance devised for carrying out the purpose of the invention. Fig. 2 is an end elevation of the same. Fig. 3 is a cross-sectional elevation taken on the line 1 2 of Fig. 1, and Fig. 4 shows a portion of the rim and tire of a bicycle-wheel and the manner in which the appliance is operated.

The appliance consists of an arc-shaped metal frame $a$, that is formed with grooves or slides $b$ and $c$ in its face and arranged parallel to each other and to the edges of the frame, so that these grooves or slides shall themselves be formed in an arc. The arched top or outer edge of the frame $a$ is preferably made approximately of the same radius as the inner periphery of the rim of the vehicle-wheel upon which the appliance is to be used, so that the grooves or slides $b$ and $c$ will be arranged concentrically with the wheel-rim.

Fitting freely within each of the slides $b$ and $c$ are bars $d$ and $e$, which are also arched, so as to allow of them fitting properly within the respective slides. The inner or opposite faces of these rods are formed with teeth thereon. A small toothed pinion $f$ is mounted medially between the two ends of the frame $a$ and gears with the teeth on each of the bars $d$ and $e$, as shown in Fig. 1, the inner edges of the slides being broken away to allow of the pinion thus gearing with the bars. This pinion is formed in one with or is secured upon a spindle $g$, that passes out through the back of the frame $a$. An enlarged flange $h$ is formed on the front face of the pinion $f$, so as to overlap portions of the slides $b$ and $c$, and this flange is provided with an eye or thumb piece $j$, by means of which the flange and pinion may be turned. The pinion is secured in its position, so that the flange will retain the bars $d$ and $e$ within their slides, by means of a nut $k$, screwed upon the end of the spindle $g$ against the back face of the frame $a$.

To the respective inner ends of each of the bars $d$ and $e$ are connected the vertical arms or fingers $l$ and $m$, that project upward above the top level of the frame $a$. The front faces of these fingers are formed with projections $n$ thereon and preferably have their top extremities curved forward, as shown in Figs. 2 and 3.

Upon the spindle $g$ and at the back of the frame $a$ is loosely articulated one end of a lever-arm or handle $o$.

In operation the two arms or fingers $l$ and $m$ are brought in as closely together as possible by revolving the pinion $f$ in one direction so as to cause the bars $d$ and $e$ to slide along their respective slides. The extremities of the arms are then inserted beneath the edge of the tire-cover and the appliance is levered down by pressing upon the arm $o$ until its back rests against the spokes of the wheel $p$, Fig. 4. The appliance is then retained in this position by turning the lever-arm $o$ behind one of the spokes of the wheel, as shown in Fig. 4. This will have the effect of lifting up the edge of the tire-cover. The pinion $f$ is then rotated so as to cause the bars $d$ and $e$ to slide inward along their respective slides and the arms $l$ and $m$ to recede away from each other, lifting the edge of the cover up as they travel along. When a certain proportion of the cover has been thus lifted, the whole will spring off the wheel, or it may easily be removed therefrom by hand.

The eye in the thumb-piece $j$ is provided to allow of the insertion of a lever for turning the pinion $f$. The projections $n$ upon the faces of the arms $l$ and $m$ will serve to prevent such arms slipping in too far under the tire-cover.

The frame $a$ being arc-shaped and the slides $b$ and $c$ being formed approximately of the same radius as the wheel-rim will insure that the arms $l$ and $m$ will while moving along their slides travel practically in a parallel line with the tire-cover, thus insuring a proper action thereon.

What I claim as my invention, and desire to secure by Letters Patent, is—

1. In means for removing the rubber tires of bicycles and other vehicles, a pair of arms the extremities of which are adapted to be passed in between the wheel-rim and the tire-cover, in combination with means whereby such arms may be made to approach toward or recede away from each other in an arc of a radius approximating to the radius of the wheel-rim, as specified.

2. In means for removing the rubber tires of bicycles and other vehicles, a pair of vertical arms formed with a projection upon each of their front faces and connected to sliding bars fitting in arched slides in the front face of a frame, and means for causing such bars to move along their slides, in opposite directions to each other, in combination with a lever-arm loosely articulated to the back face of the slide-frame, as herein specified.

3. In means for removing the rubber tires of bicycles and other vehicles, in combination, an arched frame, two parallel arched slides in the front face of the frame, sliding toothed bars fitting within each slide and provided with a vertical arm secured to each of the inner ends thereof, a pinion mounted within the frame and gearing with both of the sliding bars, a flange upon the outer face of the pinion and overlapping each of the slides in the frame, a thumb or eye piece secured to the flange, and a lever-arm loosely articulated to the back face of the frame, all as and for the several purposes herein set forth.

In testimony whereof I have signed this specification in the presence of two subscribing witnesses.

SAMUEL NICOLSON.

Witnesses:
  M. E. MORRISON,
  A. MORRISON.